(12) United States Patent
Benthien et al.

(10) Patent No.: US 10,625,861 B2
(45) Date of Patent: Apr. 21, 2020

(54) AIRCRAFT INSTALLATION ARRANGEMENT AND INSTALLATION SYSTEM FOR MOUNTING AN OVERHEAD LUGGAGE COMPARTMENT

(71) Applicant: Airbus Operations GmbH, Hamburg (DE)

(72) Inventors: Hermann Benthien, Hamburg (DE); Michael Telkamp, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 327 days.

(21) Appl. No.: 15/639,609

(22) Filed: Jun. 30, 2017

(65) Prior Publication Data
US 2018/0009530 A1    Jan. 11, 2018

(30) Foreign Application Priority Data
Jul. 5, 2016    (EP) .................................. 16178037

(51) Int. Cl.
B64D 11/00    (2006.01)

(52) U.S. Cl.
CPC .... B64D 11/003 (2013.01); *B64D 2011/0046* (2013.01)

(58) Field of Classification Search
CPC .......... B64D 11/003; B64D 2011/0046; B64D 11/00
See application file for complete search history.

(56) References Cited

U.S. PATENT DOCUMENTS 4,648,570 A * 3/1987 Abdelmaseh ............. B64C 1/22
                                                    244/117 R
4,783,189 A    11/1988 Bugg
(Continued)

FOREIGN PATENT DOCUMENTS

DE            20302693        6/2003
DE        102008020789       11/2009
(Continued)

OTHER PUBLICATIONS

European Examination Report for corresponding European Patent Application No. 16173150.0.
European Search Report, dated Dec. 16, 2016 priority document.

*Primary Examiner* — Brian M O'Hara
(74) *Attorney, Agent, or Firm* — Greer, Burns & Crain, Ltd.

(57) ABSTRACT

An installation arrangement comprising a first carrier element configured to fasten an overhead luggage compartment thereto. The first element includes a main body comprising a tubular opening, a barrel-shaped component arranged inside the tubular opening, the component comprising a through hole extending substantially perpendicular to a component longitudinal axis, and a fastener to fasten a portion of the overhead luggage compartment to the main body of the first carrier element. A second carrier element of the arrangement is a rotary joint connectable to an installation rail, the rotary joint being movable around a longitudinal axis of the installation rail and an axis perpendicular to that longitudinal axis. The installation arrangement also comprises a rod configured to be coupled with the second carrier element and to fit inside the through hole, wherein the rod is connectable to the first carrier element when the rod is arranged inside the through hole.

17 Claims, 7 Drawing Sheets

(56) References Cited

U.S. PATENT DOCUMENTS

| | | | | |
|---|---|---|---|---|
| 5,842,668 | A | * 12/1998 | Spencer | ............... B64D 11/003 244/118.1 |
| 9,308,995 | B2 | * 4/2016 | Spellman | ............... B64D 11/00 |
| 2008/0213034 | A1 | 9/2008 | Wood et al. | |
| 2011/0088243 | A1 | 4/2011 | Herzog et al. | |

FOREIGN PATENT DOCUMENTS

| | | |
|---|---|---|
| EP | 0514957 | 11/1992 |
| EP | 1568541 | 8/2005 |
| WO | 2014088600 A1 | 6/2014 |

\* cited by examiner

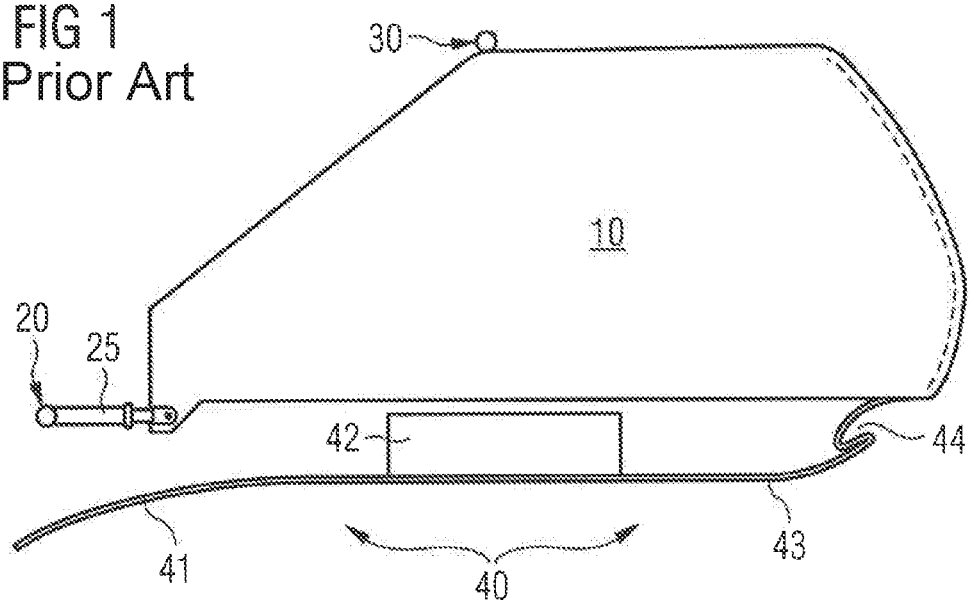
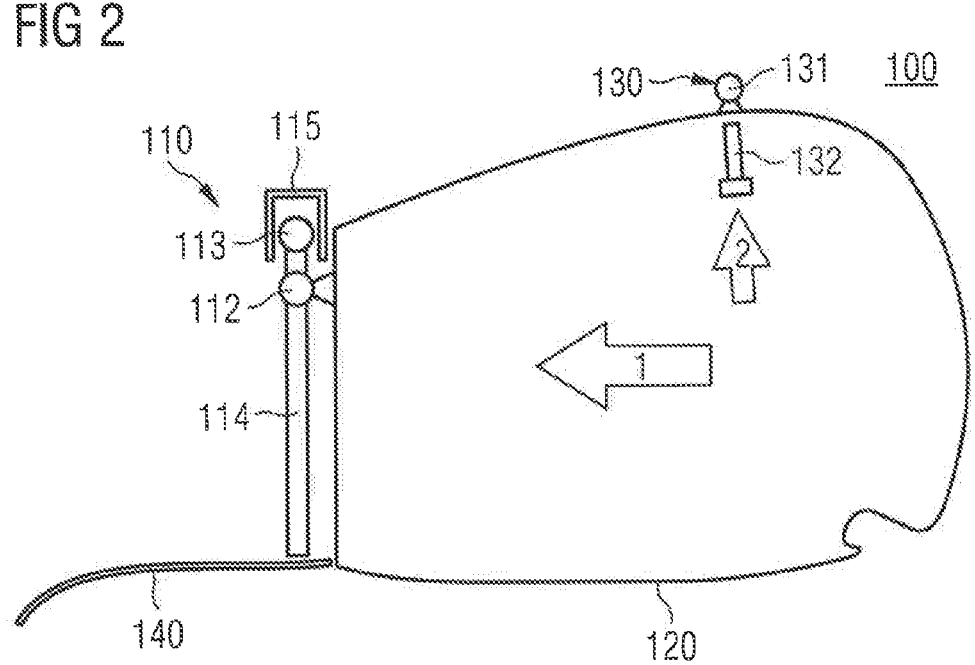

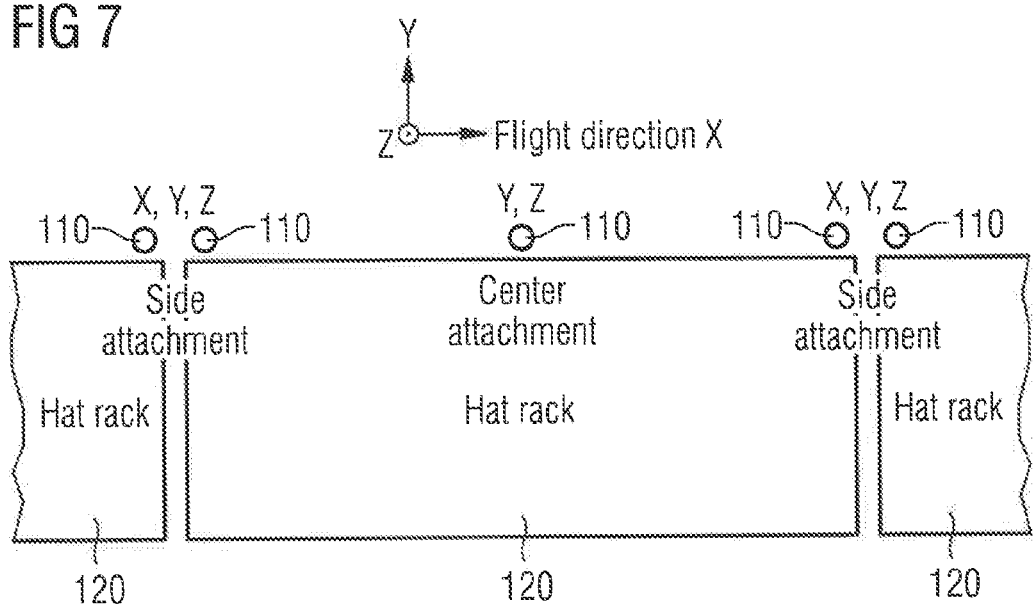
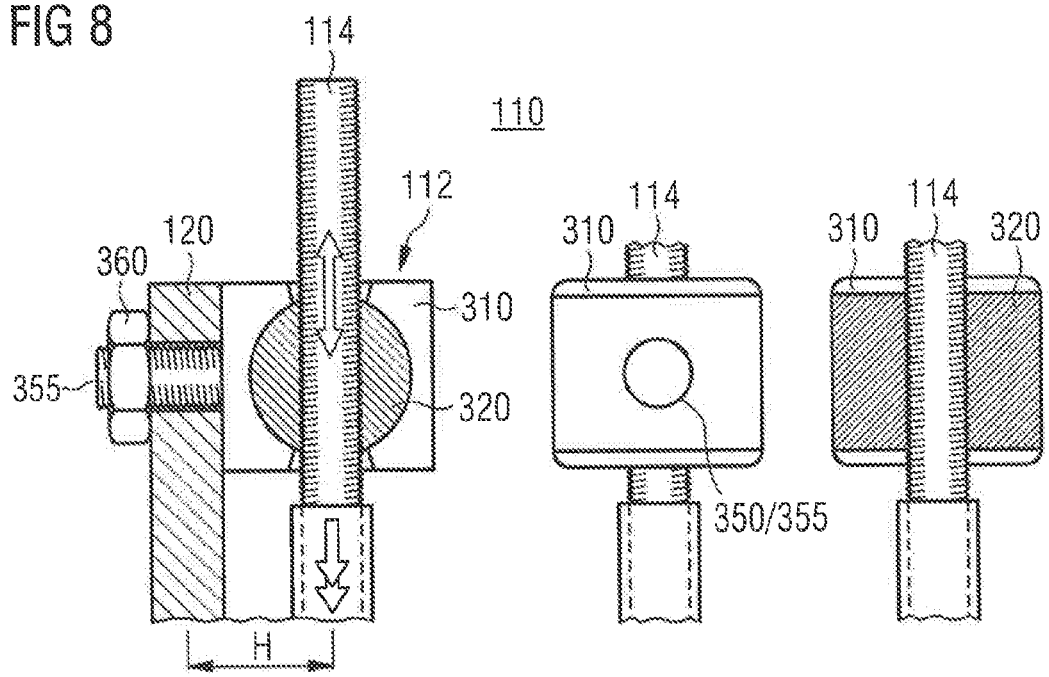

AIRCRAFT INSTALLATION ARRANGEMENT AND INSTALLATION SYSTEM FOR MOUNTING AN OVERHEAD LUGGAGE COMPARTMENT

CROSS-REFERENCES TO RELATED APPLICATIONS

This application claims the benefit of the European patent application No. 16178037.4 filed on Jul. 5, 2016, the entire disclosures of which are incorporated herein by way of reference.

BACKGROUND OF THE INVENTION

The present invention relates to an installation arrangement suitable for mounting an overhead luggage compartment in an aircraft and an installation system comprising such an installation arrangement.

An overhead luggage compartment arranged over seat rows in an aircraft is usually attached to a primary structure of the aircraft at at least two positions either directly or via an intermediate structural carrier component. FIG. 1 illustrates a conventional overhead luggage compartment 10 is attached to a primary structure (not shown) at first position 20 and an exemplary second position 30. For instance, installation bars may be affixed to the primary structure of the aircraft at positions 20 and 30 providing attachment positions for the overhead luggage compartment 10.

The overhead luggage compartment 10 includes elements forming a visible ceiling 40 such as a cove light panel 41, personal service units (PSUs) 42 and further ceiling panels 43 including a handrail 44. In order to position the overhead luggage compartment 10 and the ceiling 40 at the right location, for example, above the seat rows and in order to compensate for any tolerances of the primary structure and/or the installation bars, an adjustable fastening component 25 is employed at at least one of the first position 20 and the second position 30 (only one such a fastening component 25 is illustrated in FIG. 1).

After the ceiling elements 40, and, in particular, the cove light panel 41, have been installed, the fastening component 25 is hard to reach or not accessible at all. In order to access the fastening component 25, at least the cove light panel 41 has to be removed. Furthermore, piping and wiring, for example for electric lines, air ducts or oxygen ducts are installed at the overhead luggage compartment 10. Thus, if a replacement or maintenance on the overhead luggage compartment 10 is necessary, the entire piping and wiring has to be removed. All of this is time consuming and renders maintenance expensive.

SUMMARY OF THE INVENTION

It is an object of the present invention to provide an installation arrangement that simplifies mounting of an overhead luggage compartment in an aircraft and that maintains accessibility of the installation arrangement components after the overhead luggage compartment has been mounted.

An installation arrangement suitable for fastening a portion of an overhead luggage compartment in an aircraft comprises a first and a second carrier element as well as a rod. The first carrier element is configured to fasten the overhead luggage compartment thereto and includes a main body and a first barrel-shaped component. The main body comprises a tubular opening, while the first barrel-shaped component can be arranged inside the tubular opening of the main body. The main body may have the form of a prism, such as a cuboid, a barrel or any other suitable form. The tubular opening maybe a tubular through hole or maybe a tubular opening with one closed end, such as a tubular void.

Furthermore, the first barrel-shaped component can comprise a first through hole extending substantially perpendicular to a longitudinal axis of the first barrel-shaped component. When the first barrel-shaped component is inserted into the tubular opening, a longitudinal axis of the tubular opening coincides with the longitudinal axis of the barrel-shaped component. Thus, when the first barrel-shaped component is inserted, the first through hole extends substantially perpendicular to the longitudinal axis of the tubular opening in the main body.

The first carrier element further comprises fastening means for fastening at least a portion of the overhead luggage compartment to the main body of the first carrier element. The fastening means may be an internal fastening component configured for receiving a fastener, such as a bolt or screw, or maybe an external fastening component extending from the main body and configured for receiving a fastener, such as a nut.

The installation arrangement can further comprise a second carrier element connectable to an installation rail. The second carrier element can be a rotary joint capable of providing degrees of freedom around two axes in a coordinate system. For instance, at least a part of the second carrier element or rotary joint is movable around a longitudinal axis of the installation rail and an axis perpendicular to the longitudinal axis of the installation rail.

In addition, the installation arrangement can include a rod configured to be coupled with the second carrier element. Due to the degrees of freedom of the second carrier element or rotary joint, the rod coupled to the second carrier element can move pivotally with the same degrees of freedom, e.g., around two axes. For instance, when the installation rail extends along a longitudinal direction of the aircraft, the rod can be provided in a substantially vertical position when coupled to the second carrier element, i.e., in a position perpendicular to the longitudinal direction of the aircraft. Due to the degrees of freedom of the second carrier element, the rod can be brought into a position or orientation compensating any tolerances of the installation rail or the primary structure of the aircraft. In case of a plurality of such installation arrangements provided at the installation rail, each rod of the installation arrangements may be brought into the same relative position or orientation with respect to the installation rail.

Furthermore, the rod can be configured to fit inside the first through hole of the first barrel-shaped component of the first carrier element. When the rod is arranged inside the first through hole, the first carrier element is connectable to the rod. Since the rod is an elongated element, the first carrier element can be connected to the rod at any position along a longitudinal axis of the rod. Therefore, the overhead luggage compartment fastened to the first carrier element can be positioned anywhere along the rod, i.e., at any desired distance to the installation rail. In case of a vertical orientation of the rod, the overhead luggage compartment can be mounted at any vertical position. For instance, the overhead luggage compartment can be mounted at a vertical position meeting a certain distance from a seat row beneath the overhead luggage compartment or a floor of an aircraft cabin.

The second carrier element can include a mounting component and a second barrel-shaped component. The mounting component may be connectable to the installation rail and comprises a tubular opening. When mounted to the installation rail, the tubular opening can extend substantially in a direction along the longitudinal axis of the installation rail.

The second barrel-shaped component can be arranged inside the tubular opening of the mounting component. The second barrel-shaped component comprises a second through hole extending substantially perpendicular to a longitudinal axis of the second barrel-shaped component. Thus, the second carrier element may have a similar configuration as the first carrier element. In particular, second barrel-shaped component and/or the mounting component of the second carrier element can have the same form as the first barrel-shaped component and main body of the first carrier component, respectively.

The first through hole may have a threaded surface, and the rod may have at least on a portion of an outer surface a matching threaded surface for connecting the first carrier element variably spaced from the second carrier element. By rotating the rod the first carrier element moves along the longitudinal axis of the rod, since the first barrel-shaped component acts as a barrel nut and the rod as a threaded bolt.

Alternatively, the first through hole may have only segments of a threaded surface or segments of a ridged surface, while the rod has corresponding segments of a threaded or ridged surface. This allows insertion of the rod into the first through hole and engagement of the threaded or ridged surfaces of the first through hole and the rod by rotating the rod. For instance, if the first through hole and rod each have two segments of threaded or ridged surfaces, a quarter turn of the rod brings the threads or ridges into engagement. This provides for a fast coupling of the first carrier element to the rod at any chosen distance between the first and second carrier elements.

The second through hole of the second barrel-shaped component can be greater in size than the rod. For instance, a diameter of the second through hole may be greater than a diameter of the rod. This provides for easy inserting the rod into and through the second through hole and also for an easy rotating movement of the rod around its longitudinal axis in the second through hole. In particular, the rod can easily be rotated for adjusting the distance between the first and second carrier elements.

The rod may further comprise fastening means for coupling the rod to the second barrel-shaped component pivotally movable around an axis (e.g., a longitudinal axis) of the rod. Such fastening means may be a bore in the center of a side face of the rod in which a rivet or screw can be affixed to the rod. The rivet or screw can have a portion of greater size than a cross-section of the rod, such as a disc of greater diameter than the rod. This greater portion of the rivet or screw is also larger than the second through hole in the second carrier element. Thus, when the rod is inserted through the second through hole, the rivet or screw can be fastened to the rod, thereby preventing the rod from disengagement with the second carrier element, i.e., the second barrel-shaped component.

In addition or alternatively, the second through hole can have a threaded surface, and the rod has, at least on an end portion, a matching threaded surface for coupling the second carrier element to the rod. Thus, the second barrel-shaped component is a barrel nut into which one end of the rod can be screwed. Such a threaded solution of connecting the rod to the second carrier element also provides for adjusting a distance between the first and second carrier elements, since a rotation of the rod changes the extent to which the rod enters into the second through hole of the second barrel-shaped component.

The main body of the first carrier element may include a third through hole extending substantially perpendicular to the longitudinal axis of the tubular opening. The third through hole is arranged at a location of the main body, so that the first through hole of the first barrel-shaped component can be aligned with the third through hole, when the first barrel-shaped component is arranged inside the tubular opening of the main body. Thus, the rod extending through the first through hole also extends through the third through hole. The third through hole of the main body crosses the tubular opening thereof. Thus, the third through hole has two portions, one on each side of the through hole extending to an outer surface of the main body.

Similarly, the mounting component of the second carrier element can include a fourth through hole extending substantially perpendicular to the longitudinal axis of the tubular opening of the mounting component. The fourth through hole is arranged at a location of the mounting component so that the second through hole of the second barrel-shaped component can be aligned with the fourth through hole, when the second barrel-shaped component is arranged inside the tubular opening of the mounting component. Thus, the rod extending through the second through hole also extends through the fourth through hole. The fourth through hole of the mounting component extends into or crosses the tubular opening thereof. Thus, the fourth through hole can have two portions, one on each side of the through hole extending to an outer surface of the mounting component.

The third through hole maybe larger than the first through hole. In particular, a dimension of the third through hole, such as a diameter of the third through hole, maybe larger than a dimension (e.g., diameter) of the first through hole. This allows a movement of the rod together with the first barrel-shaped component inside the main body. Due to the barrel form of the first barrel-shaped component a rotation of the first barrel-shaped component and the rod around the longitudinal axis of the first barrel-shaped component is possible. The rod extending out of the first barrel-shaped component requires sufficient space at the main body for such movement, which is given by the larger third through hole.

Similarly, the fourth through hole in the mounting component may be larger than the second through hole in the second barrel-shaped component of the second carrier element. This provides for a space for movement of the rod within the mounting component of the second carrier element due to the barrel form of the second barrel-shaped component.

Furthermore, the second carrier element may further include a shock absorbing component arranged in the tubular opening of the mounting component. The shock absorbing component may have a cylindrical form, an outer surface of which is arranged on an inner surface of the tubular opening of the mounting component of the second carrier element. The shock absorbing component may further be configured to receive the second barrel-shaped component therein. In case of a cylindrically formed shock absorbing component an inner surface thereof may be sized to receive the second barrel-shaped component therein, i.e., the inner diameter of the shock absorbing cylindrical component is substantially equal to the outer diameter of the second barrel-shaped component.

In addition or alternatively, the shock absorbing component can be arranged in the first carrier element. For instance, a cylindrically formed shock absorbing component can be arranged between an inner surface of the tubular opening of the main body and an outer surface of the first barrel-shaped component.

According to another aspect, the second carrier element forming a rotary joint can include a holding portion and an arcuate portion. The holding portion can be connectable to the installation rail. For instance, the holding component may have one or more bores allowing one or more respective fasteners to run through and connect the holding component to the installation rail.

The arcuate portion may form a void with the holding portion and may have a fifth through hole sized to receive the rod including a predetermined clearance. For instance, the holding portion may form a ring which is covered by the arcuate portion. In this case, the arcuate portion forms a spherical segment, where the fifth through hole is arranged at its dome. Alternatively, the holding portion comprises two longitudinal elements (preferably extending along the longitudinal direction of the installation rail) in between which an arcuate portion spans. In the latter case, the arcuate portion forms a segment of a cylinder, where the fifth through hole is arranged at the center of this cylinder segment.

The rotary joint further includes an arcuate disc provided in the void and coupled to the rod. The arcuate disc may be configured to bear on a surface of the arcuate portion facing the void. Thus, the arcuate disc may also have the form of either a spherical segment or a cylinder segment with an outer diameter matching or corresponding to an inner diameter of the arcuate portion. The rod coupled to the arcuate disc can extend through the fifth through hole. When the size of the fifth through hole is larger than the size of the rod, a movement of the rod with respect to the arcuate portion is possible due to a movement of the arcuate disc within the void. Preferably, the size of the arcuate disc is smaller than the size of the void, so that the arcuate disc can slide along the mating surface of the arcuate portion without interfering with the holding portion.

The rod can further comprise an attachment means for attaching a cove light panel at an end of the rod opposite to the second carrier element. In a longitudinal direction of the rod one end is coupled to the second carrier element, while the other end provides the attachment means for attaching the cove light panel.

For example, the attachment means includes a threaded outer surface of the rod configured to receive a sleeve nut. The threaded outer surface may be formed by the same thread for connecting the first carrier element to the rod or can be a different thread specifically arranged at the rod for attaching the cove light panel. The sleeve nut may include an engaging portion engaging with a respective part of the cove light panel. For instance, the engaging portion may be a flange engaging with a corresponding flange at the cove light panel.

In addition or alternatively, the attachment means includes a center bore in a longitudinal direction of the rod configured to receive a screw. The center bore may be arranged at a side face of the rod at an end of the rod opposite to the end coupled with the second carrier element. The center bore may have a threaded inner surface to receive and affix the screw. The cove light panel may then have a corresponding hole through which the screw fits, while the head of the screw engages with a portion of the cove light panel in order to attach the cove light panel to the rod.

The rod can be split and comprises a first rod coupled with the second carrier element and a second rod. The first rod and the second rod can be connected spaced apart by a sleeve nut. This allows the coupling of the first rod to the second carrier element before attaching the remaining parts of the installation arrangement. For example, the first carrier element may be coupled with the second rod, which is then (together with the first carrier element) connected to the first rod with the sleeve nut.

Alternatively, the first carrier element is coupled to the first rod. The second rod may then be attached to the first rod with the sleeve nut when providing the cove light panel. For instance, the cove light panel may already be attached to the second rod.

Furthermore, the first carrier element may include further fastening means for fastening a portion of a further overhead luggage compartment to the main body of the first carrier element. For instance, the first carrier element may extend in the longitudinal direction of its tubular opening to such an extent that it provides space for fastening two adjacent overhead luggage compartments. When connected to the rod, the first carrier element extends in a longitudinal direction of the aircraft, so that the two adjacent overhead luggage compartments can be installed with one installation arrangement including only one rod.

Alternatively, the two adjacent overhead luggage compartments are fastened to a respective installation arrangement, so that each overhead luggage compartment is installed with its own installation arrangement.

Further, the installation rail can include bores spaced apart in the longitudinal direction of the installation rail for receiving a fastener for connecting the second carrier element to the installation rail. A plurality of bores spaced apart from each other in the longitudinal direction of the installation rail allows the connection of the installation arrangement via the second carrier element at any position along the longitudinal direction of the installation rail required for installation of one or more overhead luggage compartments.

An installation system for mounting an overhead luggage compartment in an aircraft comprises at least one of the installation arrangement as described above, and a primary structure fastening element. The primary structure fastening element may include a primary structure fastening component connectable to the primary structure of the aircraft, and a bolt-shaped component configured to be coupled with the primary structure fastening component. The bolt-shaped component may further be configured to hold another portion of the overhead luggage compartment different than the portion of the overhead luggage compartment fastened to the first carrier element. For example, the primary structure fastening element may be provided at the top portion of the overhead luggage compartment, while the installation arrangement is provided at an end or side of the overhead luggage compartment.

Such installation system allows attaching the overhead luggage compartment to the installation arrangement via the fastening means of the first carrier element and then to the primary structure fastening component via the bolt-shaped component. Thus, the overhead luggage compartment is hold securely at two positions.

BRIEF DESCRIPTION OF THE DRAWINGS

Preferred embodiments and examples of an installation arrangement and installation system are described in greater detail with reference to the attached schematic drawings in the following, wherein FIG. 1 shows a conventional overhead luggage compartment, FIG. 2 shows a cross-sectional overview of an installation system with an installation arrangement and an overhead luggage compartment, FIG. 7 shows in a top-view a plurality of overhead luggage compartments with individual installation arrangements, FIG. 8 shows a cross-section and a side view of a first carrier element for the individual installation arrangements of FIG. 7.

DETAILED DESCRIPTION OF THE PREFERRED EMBODIMENTS

Figure 3:
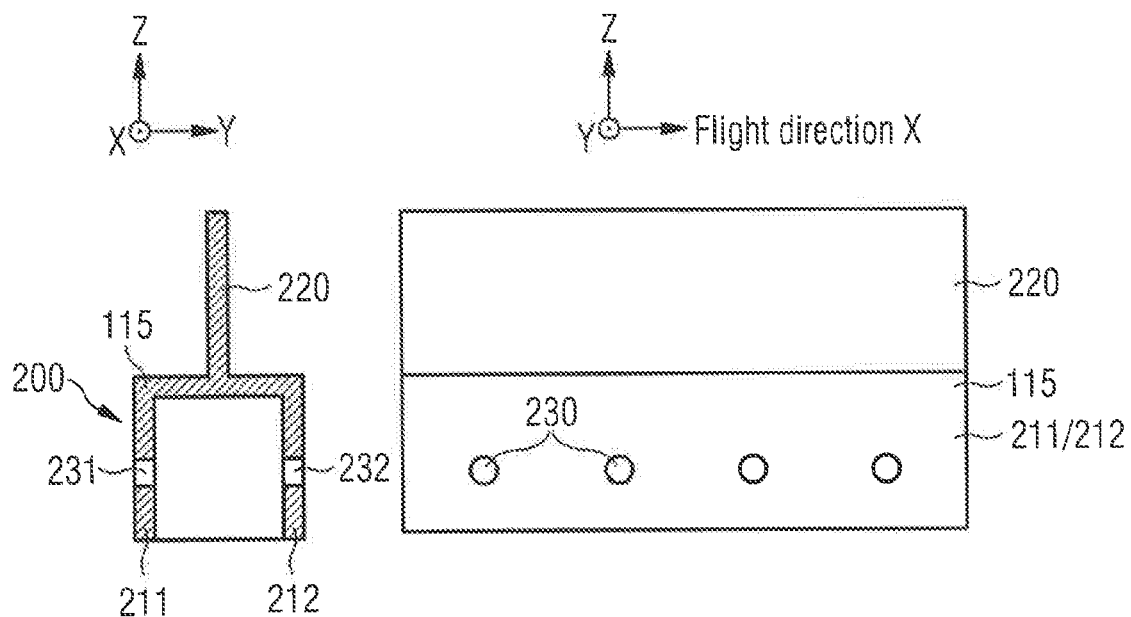
FIG. 3 shows schematically an installation rail.

FIG. 2 shows a cross-sectional overview of an installation system 100. The installation system 100 includes an installation arrangement 110 for connecting a first portion of an overhead luggage compartment 120 and a primary structure fastening element 130 for connecting the second portion of the overhead luggage compartment 120. The overhead luggage compartment 120 can be connected to a primary structure (not shown) of an aircraft. In general, the installation arrangement 110 comprises a first carrier element 112, a second carrier element 113 and a rod 114 (or carrier rod 114). The installation arrangement 110 can be connected to an installation rail 115 via a second carrier element 113. The primary structure fastening element generally includes a primary structure fastening component 131 and the bolt-shaped component 132 to be coupled with the primary structure fastening component 131.

As is illustrated in FIG. 2 by two arrows, the overhead luggage compartment 120 can be moved towards the installation arrangement 110, be fastened to the first carrier element 112 and then be fastened to the primary structure fastening component 131. Alternatively, the overhead luggage compartment 120 is first fastened to the primary structure fastening component 131 via bolt-shaped component 132 and is then coupled to the first carrier element 112 of the installation arrangement 110.

The overall structure may further include a cove light panel 140 that is connected to the installation arrangement 110.

FIG. 3 shows schematically an installation rail 115. The installation rail 115 may include an installation portion 200. The installation portion 200, according to an example, may have a substantially U-shaped cross-section with two arms 211 and 212 that is associated with a primary structure component 220 therebetween. The primary structure component 220 can be fastened to a primary structure (not shown) of the aircraft. The primary structure component 220 may be a single flange or web as depicted in FIG. 3. Alternatively, the primary structure component 220 or the entire installation rail 115 can have a different shape, e.g., I-shape or H-shape.

The installation rail 115 extends substantially in a longitudinal direction X of the aircraft, e.g., in a flight direction of the aircraft. Thus, the two arms 211 and 212 also extent in the longitudinal direction X of the aircraft and perpendicular thereto in the direction Z.

Furthermore, the installation rail 115 includes bores 230 or openings. The bores 230 are arranged in both arms 211, 212. A first bore 231 provided in arm 211 may align with a second bore 232 provided in arm 212, i.e., the bores 231, 232 have a common central axis. The bores 230 are spaced apart from each other in the longitudinal direction X of the installation rail 115. The distance between two adjacent bores 230 can be predefined in dependence of a pattern of overhead luggage compartments or other aircraft interior components to be mounted to the installation rail 115.

Figure 4:
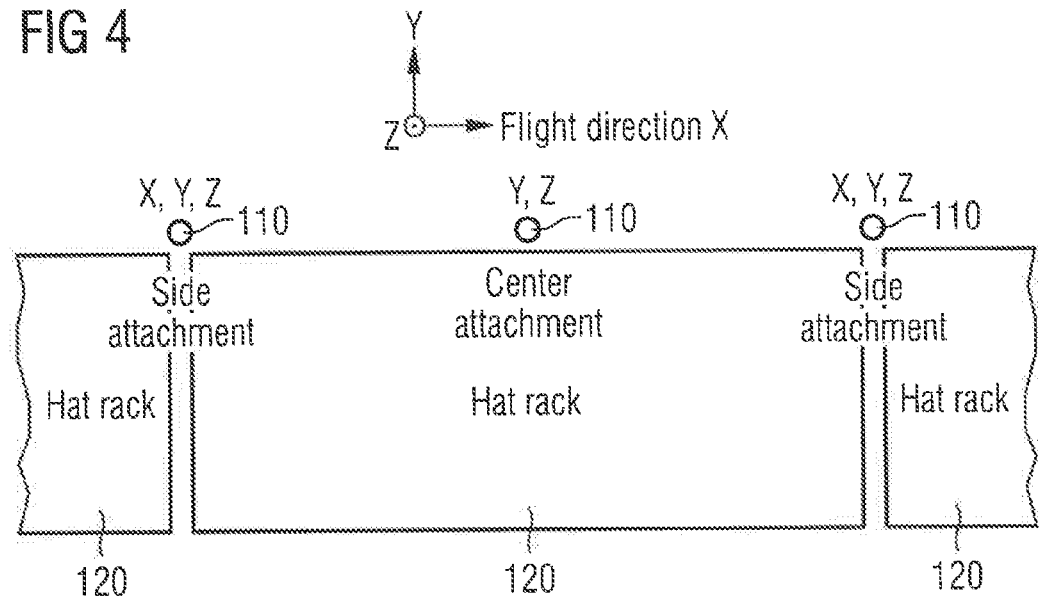
FIG. 4 shows in a top-view a plurality of overhead luggage compartments sharing an installation arrangement.

FIG. 4 shows in a top-view a plurality of overhead luggage compartments 120 (also referred to as hat racks) sharing an installation arrangement 110. One or more overhead luggage compartments 120 are arranged in a longitudinal direction X of the aircraft. According to this example, two adjacent overhead luggage compartments 120 are fastened to the primary structure of the aircraft by a single installation arrangement 110.

As illustrated in FIG. 4, each overhead luggage compartment 120 may have a further attachment position, i.e., is fastened to an installation arrangement 110, near a center of the overhead luggage compartment 120. Such center attachment may be configured to not transmit any loads in a longitudinal direction (X) of the overhead luggage compartment 120. This avoids a statically indeterminate system and allows the overhead luggage compartment 120 to move along its longitudinal direction (X) at the center attachment position. This can be achieved by providing an elongated hole at an attachment point of the overhead luggage compartment 120.

Figure 5:
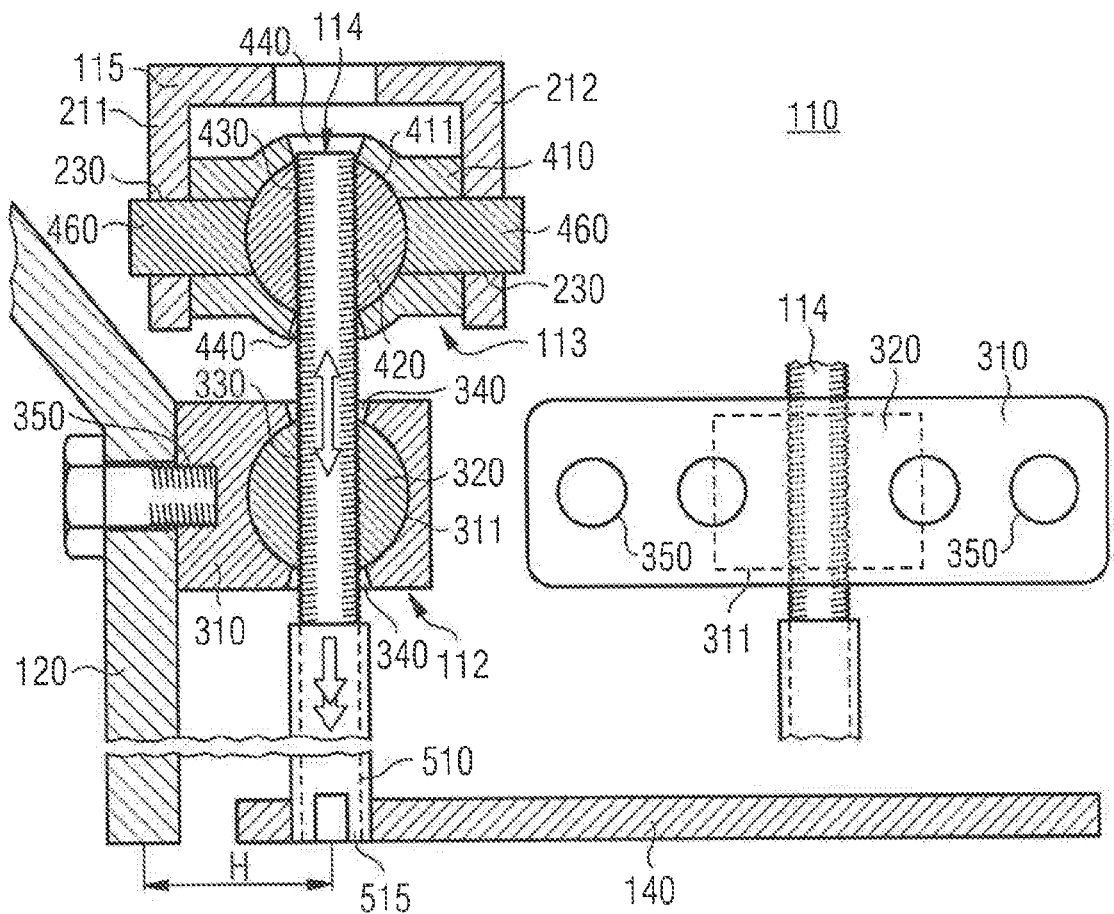
FIG. 5 shows an overview of an exemplary installation arrangement in cross-section and a side view of a first carrier element thereof.

An installation arrangement 110 of a side attachment position (between two adjacent overhead luggage compartments 120) is illustrated in FIG. 5, which shows an overview of an exemplary installation arrangement 110 in cross-section (left-hand side and bottom of FIG. 5) and a side view of a first carrier element 112 thereof (right hand side of FIG. 5). Also shown in FIG. 5 is an installation rail 115 of a U-shaped form including two arms 211 and 212.

The installation arrangement 110 suitable for fastening a portion of an overhead luggage compartment 120 in an aircraft comprises a first carrier element 112 that is configured to be fastened to the overhead luggage compartment 120. Only a portion of the overhead luggage compartment 120 is illustrated in FIG. 5. This portion may correspond to a back wall of the overhead luggage compartment 120 when viewed in the direction Y (FIG. 4), e.g., a back wall of the inside when viewed through an open lid of the overhead luggage compartment 120.

The first carrier element 112 includes a main body 310 and a first barrel-shaped component 320. The main body 310 can comprise a tubular opening 311, while the first barrel-shaped component 320 can be arranged inside the tubular opening 311 of the main body 310. The main body 310 is illustrated in the form of a prism (cuboid). This provides for a flat surface for attaching the overhead luggage compartment 120. The tubular opening 311 is illustrated as a tubular void as can be derived from the dashed line in the side view illustrated on the right-hand side of FIG. 5. The tubular void 311 may, however, be open to one of the sides of the main body 310, so that the first barrel-shaped component 320 can be inserted into the main body 310.

The first barrel-shaped component 320 can comprise a first through hole 330 extending substantially perpendicular to a longitudinal axis the first barrel-shaped component 320 and, hence, substantially perpendicular to a longitudinal axis of the tubular opening 311 in the main body 310.

The first carrier element 112 further comprises fastening means 350 for fastening a portion of the overhead luggage compartment 120 to the main body 310 of the first carrier element 112. The fastening means 350 is illustrated as an internal fastener, such as a threaded bore. The overhead luggage compartment 120 is fastened to the main body 310 of the first carrier element 112 by an external fastening component 360, such as the illustrated bolt or screw 360. Alternatively, the illustrated bolt may be fixedly coupled to the main body 310 or otherwise be inserted into the main body 310. The overhead luggage compartment 120 can then be connected to this bolt by a nut 360.

The number of fastening means 350 and corresponding fastening components can vary. For instance, a single fastening arrangement (350, 360) may be enough for a transmission of forces (loads) without momentum. Two or more fastening arrangements (350, 360) also provide for transmission of a momentum from the overhead luggage compartment 120 to the main body 310.

The right-hand side of FIG. 5 shows a side view of main body 310 having four fastening means 350 arranged along a longitudinal axis (X) of the main body 310. The fastening means 350 are arranged symmetrically with respect to the longitudinal axis of rod 114. This allows connecting one overhead luggage compartment 120 to the two fastening means 350 on one side of the rod 114 and connecting another overhead luggage compartment 120 to the two fastening means 350 on the other side of the rod 114. Thus, two overhead luggage compartments 120 can be installed with one installation arrangement 110 comprising only one rod 114. The illustrated pairs of fastening means 350 can also be arranged along a different axis, e.g., along an axis (Z) perpendicular to the longitudinal axis (X) of the main body 310.

The installation arrangement 110 further comprises a second carrier element 113 connectable to the installation rail 115. The second carrier element can be a rotary joint capable of providing a degree of freedom around two axes. The illustrated second carrier element 113 includes the mounting component 410 that is connectable to the installation rail 115. For example, the mounting component 410 may be sized to fit between the two arms 211, 212 of the installation rail 115. Using respective fastening elements 460 the mounting component 410 can be connected to the installation rail 115. The fastening elements 460 may be bolts or screws inserted through respective bores 230 of the installation rail 115. The bores 230 and fastening elements 460 may provide for a rotational movement of the fastening elements 460 relative to the installation rail 115. This provides a first degree of freedom for the second carrier element 113 around an axis Y perpendicular to the longitudinal axis X of the installation rail 115.

Furthermore, the mounting component 410 of the second carrier element 113 may comprise a tubular opening 411. The tubular opening 411 is formed and arranged similarly to tubular opening 311 in the main body 310 of the first carrier element 112. The second carrier element 113 also includes a second barrel-shaped component 420. The second barrel-shaped component 420 can be arranged inside (be inserted in) the tubular opening 411 of the mounting component 410. A movement between the second barrel-shaped component 420 and the mounting component 410 is possible, so that a second degree of freedom is provided for the second carrier element 113. Thus, the second carrier element 113 is a rotary joint.

A second through hole 430 may be provided in the second barrel-shaped component 420. The second through hole 430 extends substantially perpendicular to a longitudinal axis of the second barrel-shaped component 420. Therefore, when the second barrel-shaped component 420 is inserted in the tubular opening 411 of the mounting component 410, the second through hole 430 extends substantially perpendicular to the longitudinal axis of the tubular opening 411 of the mounting component 410.

The first and second through holes 330, 340 are arranged to receive a rod 114, thereby connecting the first and second carrier elements 112, 113. For example, the first through hole 330 of the first carrier element 112 has a threaded surface and the rod 114 has a matching threaded surface on at least a portion of its outer surface. The threaded surface of the rod 114 may be provided in a center part of the rod 114 or at any other part, where the first carrier element 112 is to be attached. By a rotation of the rod 114 the engaging threads of the rod 114 and the first through hole 330 provide for a movement of the first carrier element 112 along the longitudinal axis of the rod 114.

The rod 114 can further include attachment means 510 for attaching a cove light panel 140. The attachment means 510 may be provided at an end of the rod 114 opposite to the end of the rod 114 where the second carrier element 113 is connected. The illustrated attachment means 510 are a threaded outer surface of the rod 114 (dashed line), onto which a sleeve nut 515 is threaded. The sleeve nut 515 includes elements (not illustrated) for coupling the cove light panel 140 thereto.

Furthermore, the main body 310 of the first carrier element 112 may include a third through hole 340 extending substantially perpendicular to the longitudinal axis of the tubular opening 311. The third through hole 340 is arranged at a location of the main body 310, so that the first through hole 330 of the first barrel-shaped component 320 can be aligned with the third through hole 340, when the first barrel-shaped component 320 is arranged inside the tubular opening 311 of the main body 310. Thus, the rod 114 can extend through the first through hole 330 and the third through hole 340. The third through hole 340 of the main body 310 crosses the tubular opening 311 thereof, so that the main body has two portions provided with the third through hole 340 on both sides of the tubular opening 311.

The third through hole 340 may be larger than the first through hole 330. In particular, a dimension of the third through hole 340, such as a diameter, may be larger than a dimension (diameter) of the first through hole 330. This allows a movement of the rod 114 together with the first barrel-shaped component 320 inside the main body 310 without intervening with the main body 310.

Similarly, the mounting component 410 of the second carrier element 113 can include a fourth through hole 440 extending substantially perpendicular to the longitudinal axis of the tubular opening 411 of the mounting component 410. The fourth through hole 440 is arranged at a location of the mounting component 410, so that the second through hole 430 of the second barrel-shaped component 420 can be aligned with the fourth through hole 440, when the second barrel-shaped component 420 is arranged inside the tubular opening 411 of the mounting component 410. Thus, the rod 114 can extend through the second through hole 430 and the fourth through hole 440. The fourth through hole 440 of the mounting component 410 crosses the tubular opening 411 thereof, thereby providing two parts of the mounting component 410 on both sides of the tubular opening 411 with a through hole 440.

The fourth through hole 440 in the mounting component 410 may be larger than the second through hole 430 in the second barrel-shaped component 420 of the second carrier element 113. This provides for a space for movement of the rod 114 within the mounting component 410 of the second carrier element 113 due to a movement of the second barrel-shaped component 420 in the mounting component 410.

Figure 6:
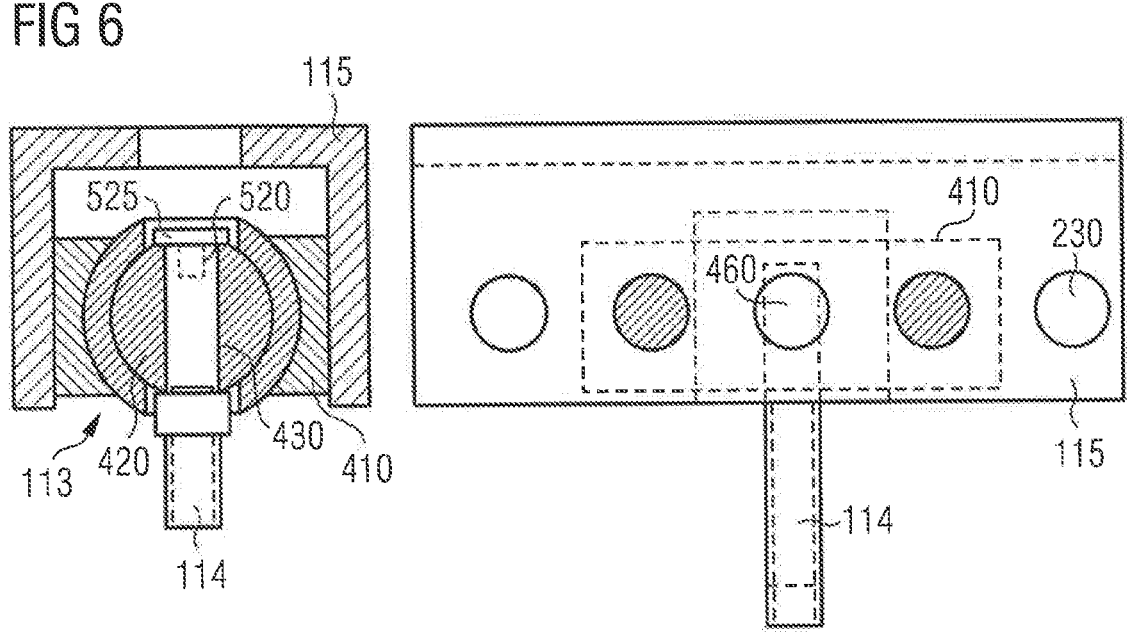
FIG. 6 shows a cross-section and side view of a second carrier element connected to an installation rail.

FIG. 6 shows a cross-section and side view of the second carrier element 113 connected to the installation rail 115. Furthermore, the rod 114 comprises fastening means 520 for coupling the rod with the second barrel-shaped component 420. The fastening means 520 may be a threaded bore in the side face of the rod 114, into which a screw 525 is threaded. The screw 525 is provided with a head of greater size than the second through hole 430 in the second barrel-shaped component 420. This provides for a coupling of the rod 114 and the second barrel-shaped component 420 in the longitudinal direction of the rod 114, but still allows a rotation of the rod 114 within the second through hole 430.

Alternatively, as shown in FIG. 5, the rod 114 may be provided with a threaded outer surface at its end inserted into the second barrel-shaped component 420. The second through hole 430 may then be provided with matching threaded inner surface, so that the rod 114 can be fixedly screwed into the second through hole 430. This arrangement provides for a fastening in the longitudinal direction of the rod 114, still allows a rotation of the rod 114 and also allows an adjustment of the extent of insertion of the rod into the second barrel-shaped component 420.

Again with respect to FIG. 6, and, in particular, the side view of the installation rail 115 on the right-hand side, the mounting component 410 may extend in a longitudinal direction of the installation rail 115 over more than one bore 230. In this case, the mounting component 410 could be fastened to the installation rail 115 with more than one fastening element 460. This would provide for a better load transmission into the installation rail 115. However, a rotation of the second carrier element 113 around the perpendicular axis Y of the installation rail 115 would be prevented.

FIG. 7 shows in a top-view a plurality of overhead luggage compartments 120 (also referred to as hat racks) with individual installation arrangements 110. As can be derived from a comparison of FIGS. 4 and 7 the overhead luggage compartments 120 are installed independent of each other, since each overhead luggage compartment 120 is provided with its own installation arrangement(s) 110.

Correspondingly, as illustrated in FIG. 8, the installation arrangement 110 includes a first carrier element 112 with only one fastening means 350 for fastening one overhead luggage compartment 120. FIG. 8 further illustrates fastening means 350 of the first carrier element 112 in the form of (threaded) bolt 355, onto which the overhead luggage compartment 120 can be moved with a respective hole in the overhead luggage compartment 120. Both elements are then affixed to each other with a nut 360. This allows the reduction of the lever arm of the overhead luggage compartment 120 with respect to the longitudinal axis of the rod 114. As can be derived from a comparison of FIGS. 5 and 8, the solution provided in FIG. 8 has a smaller lever arm than the solution provided in FIG. 5, since the latter requires an interior fastening means 350 which shall not intervene with the tubular opening 311.

Figure 9:
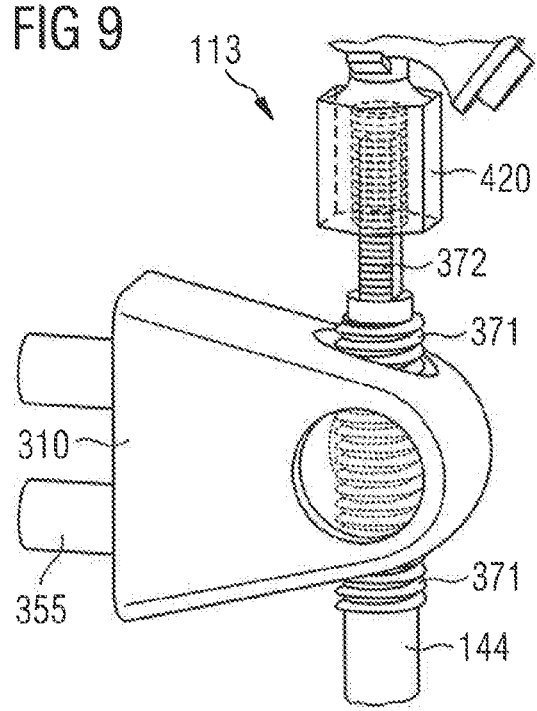
FIG. 9 shows a three-dimensional view of an exemplary installation arrangement.

FIG. 9 shows a three-dimensional view of an exemplary installation arrangement 110, where the first barrel-shaped component 320 has been omitted to allow a view inside the tubular opening 311. The rod 114 is provided with a portion having a thread 371 on its outer surface. This thread 371 is configured to engage with a corresponding thread of the first barrel-shaped component 320 (not shown in FIG. 9).

In addition, FIG. 9 depicts two fastening means 350 of the first carrier element 112 in the form of two (threaded) bolts 355, onto which the overhead luggage compartment 120 (not shown in FIG. 9) can be moved employing respective holes or openings in the overhead luggage compartment 120. Both elements can then be affixed to each other with a nut 360 (not shown in FIG. 9). The illustrated arrangement of two bolts 355 provides for a load transmission including momentums from the overhead luggage compartment 120 to the first carrier element 112.

Furthermore, the rod 114 comprises a ridged section 372 at an upper end of the rod 114. This ridged section 372 provides ridged segments on two sides of the rod 114 interrupted by two plain surface segments. This provides for inserting the rod into the second barrel-shaped component 420 (illustrated as a cap-like component) which has corresponding ridged and plain segments at an angle of about 90°. When turning the rod 114 by 90°, the ridges of the rod 114 and the second barrel-shaped component 420 become engaged and the rod 114 can be connected to the second barrel-shaped component 420 at the insertion level before turning the rod 114.

Figure 10:
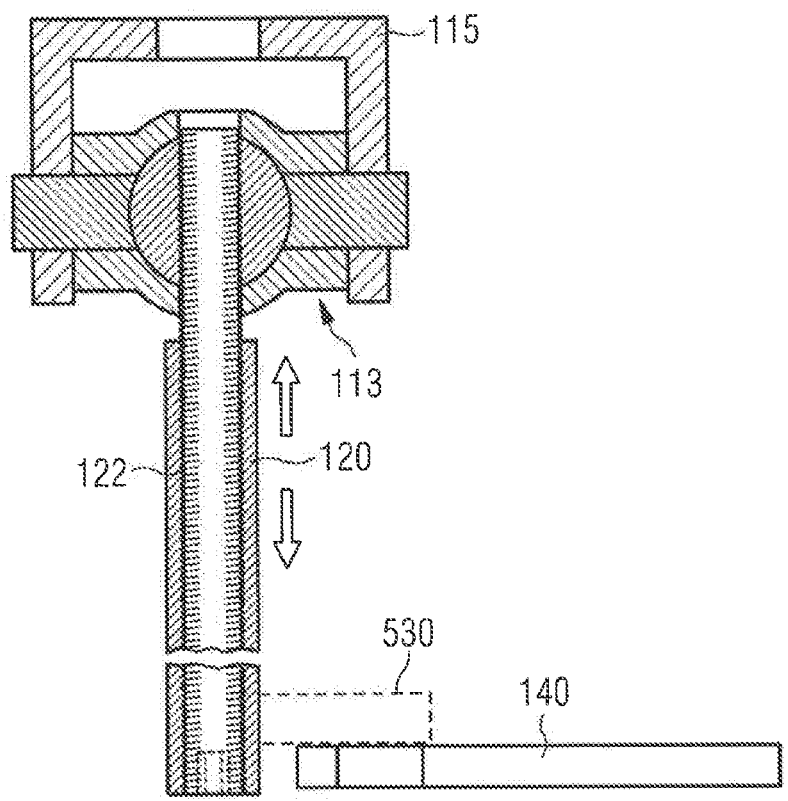
FIG. 10 shows a cross-section of an exemplary variant of an installation arrangement.

FIG. 10 shows a cross-section of an exemplary variant of an installation arrangement 110. Here, the first carrier element 112 is integrated into the overhead luggage compartment 120. For instance, the overhead luggage compartment 120 may be provided with a tubular element 122. This tubular element 122 may have a threaded interior surface, into which the rod 114 can be screw by engaging matching threads (not shown) of the rod 114. Alternatively, the tubular element 122 and the rod 114 may be provided with ridged and plain segments as explained with respect to the second carrier element 113 in FIG. 9.

The cove light panel 140 can then be attached to the tubular element 122 of the overhead luggage compartment 120 by a corresponding fastening means 530. Alternatively, the tubular element 122 has an open end at its bottom, so that the rod 114 can extend to the outside of the overhead luggage compartment 120 at which the cove light panel 140 can be attached as described with respect to FIG. 5.

Figure 11:
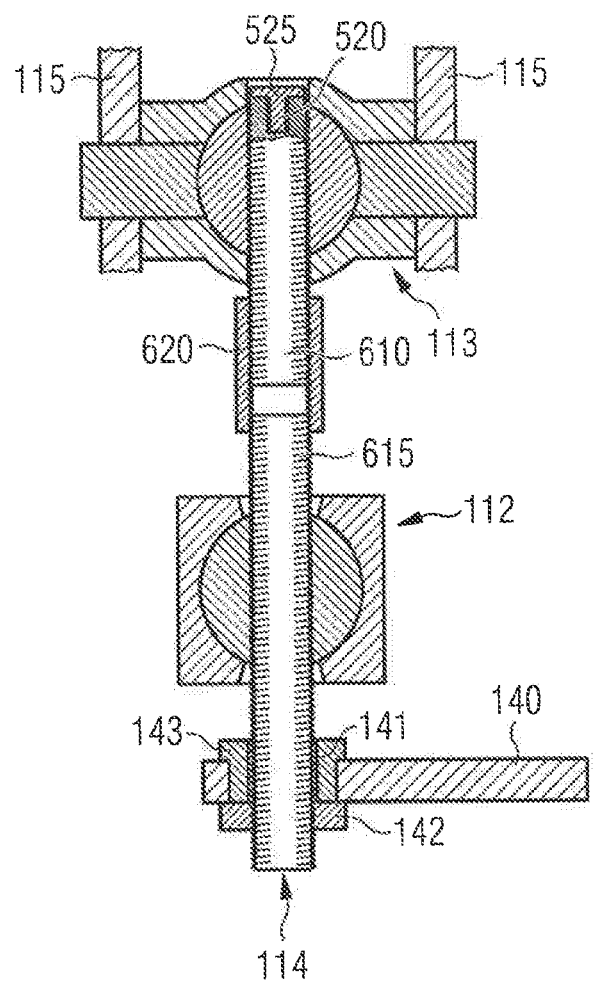
FIG. 11 shows a cross-section of an exemplary further variant of an installation arrangement.

FIG. 11 shows a cross-section of an exemplary further variant of an installation arrangement 110. In this exemplary variant, the rod 114 is split and comprises a first rod 610. The first rod 610 can be coupled with the second carrier elements 113 in any of the above described manners. The rod 114 further comprises a second rod 615 that is connected to the first rod 610 by a sleeve nut 620. The longitudinal extent of the sleeve nut 620 provides for a secure connection of the first rod 610 with the second rod 615, while also allowing the installation of the first rod 610 and the second rod 615 in a spaced apart manner.

The first carrier element 112 is illustrated as being mounted to the second rod 615. This variant allows installation of the second carrier element 113 in the installation rail 115 and the attachment of the first rod 610 at the second carrier element 113. The overhead luggage compartment (not shown in FIG. 11) and the cove light panel 140 can then be mounted to the first rod to 610 via the second rod 615 and the sleeve nut 620.

It is to be understood, that the first carrier element 112 may alternatively be mounted to the first rod 610 above the sleeve nut 620. The cove light panel 140 can then be attached to the sleeve nut 620 at a later stage with the second rod 615.

In addition, FIG. 11 also illustrates a further variant of attaching the cove light panel 140 to rod 114 compared to the attachment illustrated in, for example, FIG. 5. In FIG. 11 the cove light panel 140 is provided with a through hole 141, through which the rod 114 or the second rod 615 may run. The cove light panel 140 is then attached to the rod 114, 615 with a nut 142. For instance, the nut 142 may be threaded onto a threaded outer surface of the rod 114, 615. Alternatively, the outer surface of the rod 114, 615 may be plain and the cove light panel 140 is attached to the rod 114, 615 by a nut 142 screwed onto a bushing 143. The bushing 143 may be provided with a flange, so that the bushing is squeezed into the through hole 141 of the cove light panel 140 and onto the rod 114, 615.

Figure 12:
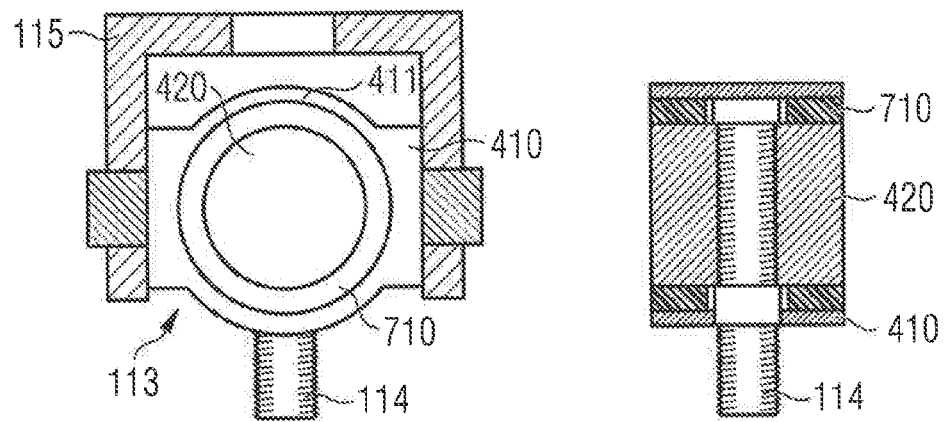
FIG. 12 shows a cross-section of a second carrier element including a shock absorbing component.

FIG. 12 shows a cross-section of a second carrier element 113 including a shock absorbing component 710. The shock absorbing component 710 can be arranged in the tubular opening 411 of the mounting component 410. The shock absorbing component 710 can further be configured to receive the second barrel-shaped component 420. Thus, the shock absorbing component 710 may be formed as a cylinder that is sized to fit between the mounting component 410 and the second barrel-shaped component 420, the latter of which is also sized smaller than compared to the variant without shock absorbing component 710. Thus, any vibrations or other forces carried by the primary structure of the aircraft and introduced into the installation rail 115 may be absorbed or at least reduced by shock absorbing component 710. The interior components, such as the overhead luggage compartment 120 and/or cove light panel 140, do not receive the same vibrations or forces from the primary structure. This reduces noise within the aircraft and also protects the interior components.

Figure 13:
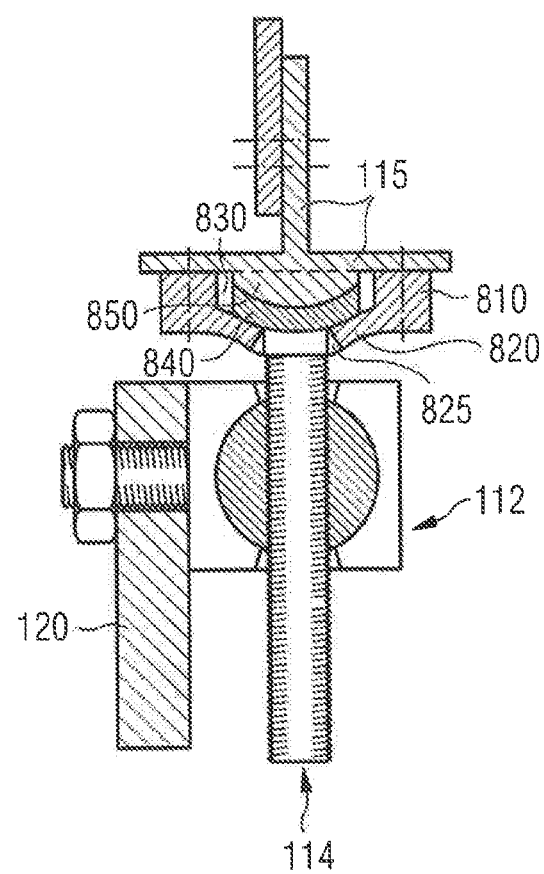
FIG. 13 shows a cross-section of an installation arrangement having a variant of a second carrier element.

FIG. 13 shows a cross-section of an installation arrangement 110 having a variant of a second carrier element 113. In this variant, the second carrier element includes a holding portion 810 connectable to the installation rail 115. The second carrier element 113 further comprises an arcuate portion 820 forming a void 830 with the holding portion 810. The arcuate portion 820 includes a fifth through hole 825 to receive the rod 114 including a predetermined clearance. The size (for example diameter) of the fifth through hole 825 is larger than the size (for example diameter) of the rod 114 providing the rod 114 with a certain clearance for movement.

The second carrier element 113 also includes an arcuate disc 840 provided in the void 830. The arcuate disc 840 is coupled to the rod 114 so that the arcuate disc 840 bears any load introduced by the rod 114 on the surface of the arcuate portion 820 facing the void 830. The void 830 is also dimensioned larger than the arcuate disc 840 to provide the arcuate disc 840 with enough space for movement. Thus, the second carrier element 113 also provides a rotary joint having at least two degrees of freedom for the rod 114.

In addition, an arcuate element 850 may be provided on the installation rail 115. The arcuate element 850 can be arranged to provide a second bearing surface for the arcuate disc 840 on a side opposite to the arcuate portion 820 of the second carrier element 113. The arcuate element 850 may be of an elastic material so that the arcuate disc is less likely to be pushed towards the installation rail 115. Shock absorption is also achieved by such elastic arcuate element 850.

It is to be understood that the examples and variants of certain components and elements of the installation arrangement(s) illustrated in one of the Figures and described above can be combined with examples and variants illustrated in another Figure.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An installation arrangement suitable for fastening a portion of an overhead luggage compartment in an aircraft, the installation arrangement comprising:
    a first carrier element configured to fasten the overhead luggage compartment thereto, the first carrier element including:
        a main body comprising a tubular opening,
        a first barrel-shaped component arranged inside the tubular opening of the main body, the first barrel-shaped component comprising a first through hole extending substantially perpendicular to a longitudinal axis of the first barrel-shaped component, and
        fastening means fastening a portion of the overhead luggage compartment to the main body of the first carrier element; and
    a second carrier element being a rotary joint connecting to an installation rail, the rotary joint being movable around a longitudinal axis of the installation rail and an axis perpendicular to the longitudinal axis of the installation rail; and
    a threaded rod coupled with the first and second carrier element,
    wherein the rod is arranged inside the first through hole and configured to adjust a distance between the first and second carrier element.

2. The installation arrangement according to claim 1, wherein the second carrier element includes:
    a mounting component connectable to the installation rail and comprising a tubular opening, and
    a second barrel-shaped component arranged inside the tubular opening of the mounting component, the second barrel-shaped component comprising a second through hole extending substantially perpendicular to a longitudinal axis of the second barrel-shaped component.

3. The installation arrangement according to claim 2, wherein the first through hole has a threaded surface, and the rod has a matching threaded surface.

4. The installation arrangement according to claim 2, wherein the second through hole of the second barrel-shaped component is greater in size than the rod.

5. The installation arrangement according to claim 2, wherein the rod further comprises fastening means for coupling the rod to the second barrel-shaped component pivotally movable around an axis of the rod.

6. The installation arrangement according to claim 2, wherein the second through hole has a threaded surface, and the rod has a matching threaded surface for coupling the second carrier element to the rod.

7. The installation arrangement according to claim 2, further comprising at least one of:
   the main body including a third through hole extending substantially perpendicular to the longitudinal axis of the tubular opening of the main body, the first through hole being aligned with the third through hole when the first barrel-shaped component is arranged inside the tubular opening of the main body, or
   the mounting component including a fourth through hole extending substantially perpendicular to the longitudinal axis of the tubular opening of the
   mounting component, the second through hole being aligned with the fourth through hole when the second barrel-shaped component is arranged inside the tubular opening of the mounting component.

8. The installation arrangement according to claim 7, wherein the third through hole is larger than the first through hole.

9. The installation arrangement according to claim 7, wherein the fourth through hole is larger than the second through hole.

10. The installation arrangement according to claim 2, wherein the second carrier element further includes a shock absorbing component arranged in the tubular opening of the mounting component and configured to receive the second barrel-shaped component therein.

11. The installation arrangement according to claim 1, wherein the second carrier element includes:
   a holding portion connectable to the installation rail, an arcuate portion forming a void with the holding portion and having a fifth through hole sized to receive the rod including a predetermined clearance, and an arcuate disc provided in the void and coupled to the rod, wherein the arcuate disc is configured to bear on a surface of the arcuate portion facing the void.

12. The installation arrangement according to claim 1, wherein the rod further comprises an attachment means for attaching a cove light panel at an end of the rod opposite to the second carrier element.

13. The installation arrangement according to claim 12, wherein the cove light panel includes a sleeve nut to receive the rod.

14. The installation arrangement according to claim 12, wherein the attachment means includes a center bore in a longitudinal direction of the rod configured to receive a screw.

15. The installation arrangement according to claim 1, wherein the first carrier element includes further fastening means for fastening a portion of a further overhead luggage compartment to the main body of the first carrier element.

16. The installation arrangement according to claim 1, wherein the installation rail includes bores spaced apart in the longitudinal direction of the installation rail for receiving a fastener for connecting the second carrier element to the installation rail.

17. An installation system for mounting an overhead luggage compartment in an aircraft, the installation system comprising:
   at least one installation arrangement including:
      a first carrier element configured to fasten the overhead luggage compartment thereto, the first carrier element including:
         a main body comprising a tubular opening,
         a first barrel-shaped component arranged inside the tubular opening of the main body, the first barrel-shaped component comprising a first through hole extending substantially perpendicular to a longitudinal axis of the first barrel-shaped component, and
         fastening means fastening a portion of the overhead luggage compartment to the main body of the first carrier element; and
      a second carrier element being a rotary joint connecting to an installation rail, the rotary joint being movable around a longitudinal axis of the installation rail and an axis perpendicular to the longitudinal axis of the installation rail; and
      a threaded rod coupled with the first and second carrier element,
      wherein the rod is arranged inside the first through hole and configured to adjust a distance between the first and second carrier element; and
   a primary structure fastening element including:
      a primary structure fastening component connectable to the primary structure of the aircraft, and
      a bolt-shaped component configured to be coupled with the primary structure fastening component and to hold another portion of the overhead luggage compartment different than the portion of the overhead luggage compartment fastened to the first carrier element.

* * * * *